United States Patent [19]
Richard

[11] Patent Number: 5,642,781
[45] Date of Patent: Jul. 1, 1997

[54] MULTI-PASSAGE SAND CONTROL SCREEN

[75] Inventor: Bennett M. Richard, Kingwood, Tex.

[73] Assignee: Baker Hughes Incorporated, Houston, Tex.

[21] Appl. No.: 320,034

[22] Filed: Oct. 7, 1994

[51] Int. Cl.$^6$ .................................................. E21B 43/08
[52] U.S. Cl. ..................... 166/231; 166/236; 166/242.5
[58] Field of Search ................................. 166/228, 233, 166/278, 230, 236, 231, 242.5; 210/497.01, 510.1

[56] References Cited

U.S. PATENT DOCUMENTS

| | | | |
|---|---|---|---|
| 1,027,917 | 5/1912 | Smith | 166/227 |
| 1,229,437 | 6/1917 | Foster . | |
| 1,342,986 | 6/1920 | Cater . | |
| 2,011,518 | 8/1935 | Griffin . | |
| 2,310,507 | 2/1943 | Bodey, Jr. . | |
| 2,327,687 | 8/1943 | Williams et al. . | |
| 2,530,223 | 11/1950 | Breaux | 166/228 |
| 2,602,465 | 7/1952 | Goehring . | |
| 2,838,120 | 6/1958 | Allmendinger et al. | 166/230 |
| 2,990,017 | 6/1961 | Powers . | |
| 3,087,560 | 4/1963 | Dodson . | |
| 3,388,448 | 6/1968 | Lovett . | |
| 3,764,525 | 10/1973 | Goodman et al. . | |
| 3,816,894 | 6/1974 | Howard et al. . | |
| 3,830,373 | 8/1974 | Sixt et al. . | |
| 3,996,640 | 12/1976 | Blue et al. . | |
| 4,204,967 | 5/1980 | Bannister . | |
| 4,296,810 | 10/1981 | Price | 166/228 |
| 4,428,423 | 1/1984 | Koehler et al. | 166/231 |
| 4,443,233 | 4/1984 | Moran . | |
| 4,487,259 | 12/1984 | McMichael, Jr. | 166/228 |
| 4,750,561 | 6/1988 | Dickinson et al. | 166/278 |
| 4,767,426 | 8/1988 | Daly et al. . | |
| 4,801,379 | 1/1989 | Ehrsam et al. . | |
| 4,821,800 | 4/1989 | Scott et al. . | |
| 4,858,691 | 8/1989 | Ilfrey et al. | 166/230 X |
| 4,865,128 | 9/1989 | Dickinson et al. | 166/278 |
| 4,872,509 | 10/1989 | Dickinson et al. | 166/278 |
| 4,917,183 | 4/1990 | Gaidry et al. . | |
| 4,974,672 | 12/1990 | Dickinson et al. | 166/55.1 |
| 5,004,049 | 4/1991 | Arterbury | 166/228 |
| 5,035,285 | 7/1991 | Dickinson et al. | 166/65.1 |
| 5,165,476 | 11/1992 | Jones . | |
| 5,190,102 | 3/1993 | Arterbury et al. | 166/228 |

(List continued on next page.)

FOREIGN PATENT DOCUMENTS

| | | |
|---|---|---|
| 133624 | 10/1985 | European Pat. Off. . |
| 2034090 | 1/1969 | France . |
| 794372 | 4/1958 | United Kingdom . |
| 2088421 | 6/1982 | United Kingdom . |

OTHER PUBLICATIONS

Christoph, Hamann, "Feindraftgewebe als Filtermedium," Draht, 39 12, 1988, 1164–1168.

Wade Dickinson, et al, "Horizontal Radials Enhance Oil Production From A Thermal Project"; Oil & Gas Journal; p. 116; May 4, 1992.

W. Dickinson, et al, "Slim Hole Multiple Radials Drilled With Coiled Tubing"; Presented at Second Latin American Petroleum Engineering Conference (SPE) in Caracas, Venezuela; Mar. 8–11, 1992.

W. Dickinson, et al, "The Ultrashort Radius Radial System Applied to Thermal Recovery of Heavy Oil"; Presented at Western Regional SPE Meeting in Bakersfield, California; Mar. 30–Apr. 1, 1992.

Primary Examiner—Frank Tsay
Attorney, Agent, or Firm—Steve Rosenblatt, Esq.

[57] ABSTRACT

An apparatus for controlling sand production within a wellbore completed to a subterranean reservoir is disclosed. The apparatus will include a base supporting member that has a series of perforations included thereon. A jacket member is disposed about the base supporting member, with the jacket member being a helical member with overlapping loops forming multiple passages for the flow of a subterranean gas and fluid. A protective member disposed about the jacket may also be included, with the protective member having a series of perforations formed thereon.

29 Claims, 9 Drawing Sheets

U.S. PATENT DOCUMENTS

| | | |
|---|---|---|
| 5,200,072 | 4/1993 | Frejborg et al. . |
| 5,223,136 | 6/1993 | Gilbert . |
| 5,230,726 | 7/1993 | Smith et al. . |
| 5,259,512 | 11/1993 | Czerwoniak . |
| 5,293,935 | 3/1994 | Arterbury et al. ............ 166/228 |
| 5,318,119 | 6/1994 | Lowry et al. . |
| 5,404,954 | 4/1995 | Whitebay et al. . |
| 5,417,859 | 5/1995 | Bakula . |

MULTI-PASSAGE SAND CONTROL SCREEN

BACKGROUND OF THE INVENTION

In order to produce hydrocarbon fluids and gas, a wellbore must be completed to a hydrocarbon bearing reservoir. Many times, the hydrocarbon reservoir is a sandstone, and many times these sandstone reservoirs are unconsolidated. Operators have long recognized the advantages of preventing sand production from high rate production wells and unconsolidated reservoirs.

Thus, liners, screens, and gravel packing have been employed in order to control formation sand production. Gravel packing is a completion procedure that is performed to prevent sand production from unconsolidated sandstone formations and high production rate wells. It consists of placing a screen or slotted liner in the wellbore wherein the wellbore may be an open hole or cased hole, then filling the perforation tunnels and the annular area between the screen and the casing or open hole with specially sized, highly permeable gravel pack sand. The formation sand bridges on the gravel pack sand, and the gravel pack sand bridges on the screen. It may be referred to as a "reinforcement device" (two-stage filter) for this reason. This reinforcement device allows for sand free production at most rates.

Many types of wire-wrapped screens are available, including ribbed, all-welded, grooved, and wrapped-on-pipe. The all-welded screen includes the wrapped screen welded to longitudinal wire ribs at each point of contact. Spacer lugs, solder strips, and weld beads are not required and, therefore, the all-welded screen is stronger and more corrosion-resistant; it also has a lower pressure drop, and it will not unravel if the wire is eroded or broken.

The configuration of the openings in all screens is very important. If the sides of the slots are parallel and oriented radially outward, plugging may occur as the small sand grains bridge the slot. To reduce the chance of this occurring, the wire used to wrap the screen is wedge-shaped.

For gravel packing, the gauge of the screen should be small enough to prevent the passage of the gravel-pack sand. Slot width is usually taken as one to five thousandths of an inch smaller than the diameter of the smallest gravel-pack sand grains. The screen diameter should be as large as possible and yet leave adequate room for packing gravel.

Despite these advances, the prior art devices still present numerous problems. Presently, operators are completing in highly deviated wellbores. Thus, this presents the problem of successfully navigating through high angle dog legs. Other problems include cutting out the screen due to erosion of the screen at the slots which allow migration and eventual production of gravel pack and formation sand. Also, the plugging and subsequent permeability reduction that leads to excessive pressure drops is present with the prior art screens. Another problem is the expense of manufacturing prior art screens. Therefore, there is a need for a screen used in high angle wells that will effectively prevent sand production while maintaining productivity.

SUMMARY OF THE INVENTION

A multi-passage sand control screen apparatus for controlling sand production within a wellbore completed to a subterranean reservoir is disclosed. The wellbore may be an open hole completion or may be cased. If the wellbore has been cased, a series of perforations will have been created to communicate the subterranean reservoir with the annulus of the wellbore. The multi-passage sand control screen apparatus includes a supporting member formed with a series of perforations thereon. Also, a jacket member disposed about the supporting member will be included, with the jacket in the preferred embodiment being comprised of a helical member with the helical member being a wound coil, and with the helical member being contoured such that the overlapping loops form a first, second and third passage for the flow of subterranean gas and fluids. The first, second and third passages are capable of both expansion and contraction as well as creating an effective barrier from the entrance of formation and gravel pack sand, if applicable, into the inner diameter of the supporting member. Further, the jacket member is attached at the first end and the second end of the supporting member so that linear movement of the jacket about the first supporting member can be controlled.

The apparatus will contain on the first end and second end of the supporting member thread means for threadedly attaching a mating thread of a second supporting member to the first supporting member. The second supporting member having a first end and a second end, with the first and second end also containing thread means for threadedly attaching to the first support member so that the first supporting member and the second member are interconnected in tandem relationship. Also included will be a second jacket member disposed about the second supporting member, and wherein the second jacket member is attached to the second supporting member at the first end and second end, respectively, of the second supporting member so that linear movement of the jacket member about the second supporting member can be controlled. Additional supporting members can be attached as described to achieve the desired length for the desired wellbore completion.

The apparatus of the present invention may further comprise a production conduit for conveying the reservoir fluids and gas to the surface; a packer means, operatively connected to the conduit, for sealingly engaging the wellbore; a gravel packing tool for gravel packing the wellbore if applicable; a sump packer, operatively connected to the second end of the supporting means, for sealingly engaging the wellbore at a lower end.

The multi-passage sand control screen may further include another screen, disposed about the jacket member, for preventing the flow of sand from the subterranean formation into the inner diameter of the supporting member. In one embodiment, the screen means comprises a flow conduit member with perforations formed thereon. In another embodiment, the screen may include a wire helically wrapped about longitudinal ribs overlaying the jacket member, with the wire being attached to the rib wire, and wherein the space between each wrap of the wire about the longitudinal rib forms a passage for the subterranean gas and fluids.

In another embodiment, the screen comprises a resin-coated gravel pack sand formed about the jacket, with the resin-coated gravel pack sand being bonded to the jacket; and a second supporting member disposed about the resin-coated gravel pack sand, with the second supporting member having disposed thereon a plurality of ports for allowing the passage of subterranean gas and fluids.

In yet another embodiment, the screen comprises a resin-coated gravel pack sand formed about the jacket, with the resin-coated gravel pack sand being bonded to the jacket; and a wire helically wrapped about the resin-coated gravel pack sand, with the wire being bonded to the resin-coated gravel pack sand, and attached to longitudinal ribs, and wherein each wrap of the wire about said resin-coated gravel pack sand forms a passage for the subterranean gas and fluids.

A feature of the present invention includes use of the helically wrapped jacket member that provides for at least a first and second passage, with contraction and expansion possible in both the first and second passages. Another feature provides the jacket member be attached to the supporting pipe. Yet another feature includes the use of a screen disposed about the jacket member.

Still yet another feature provides that the screen may be a wire-wrap anchored to the base pipe. Another feature includes the screen can be a resin-coated sand that is bonded to the jacket member. Yet another feature includes having a conduit with perforations formed thereon being adapted to encircle the jacket member.

An advantage of the present invention includes use of a jacket member that has a multi-passage, circuitous flow paths that are capable of expansion and retraction that effectively block passage of sand. Another advantage consist of allowing use of the multi-passage sand control screen in highly deviated wellbores. Yet another advantage is that the jacket member allows minimal pressure drop therethrough.

BRIEF DESCRIPTION OF THE INVENTION

DESCRIPTION OF THE PREFERRED EMBODIMENTS

Figure 1:
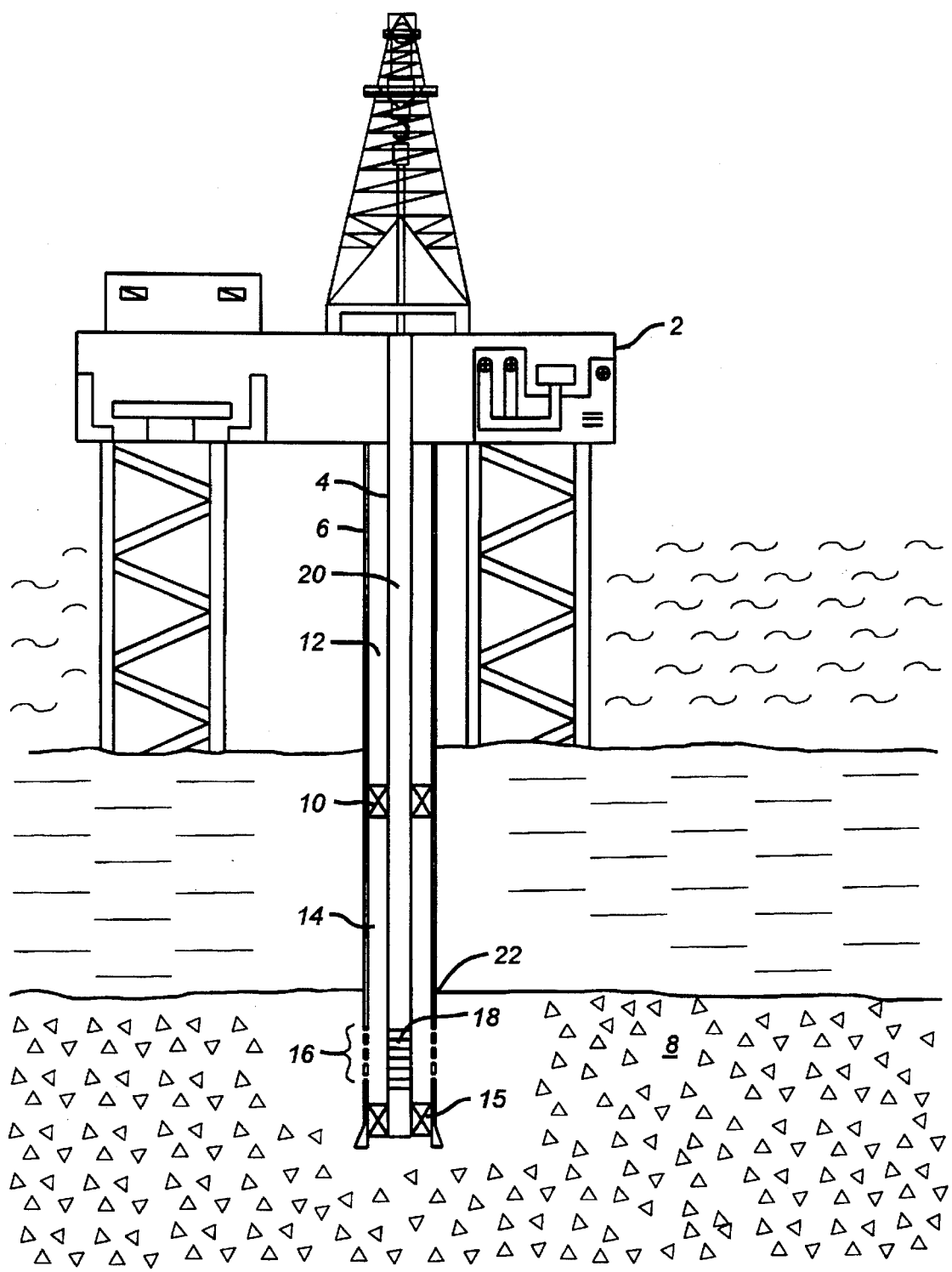
FIG. 1 is an illustration of a wellbore extending from a drilling platform.

Referring to FIG. 1, a representative platform 2 that has extending therefrom a production string 4 that extends into a wellbore 6 which in the illustration is a casing string. The wellbore 6 will intersect a hydrocarbon bearing reservoir 8. A packer 10 for sealingly engaging the wellbore 6 is provided so that an upper annulus 12 and lower annulus 14 is formed. A lower packer 15, or sump packer, is also provided for gravel packing purposes.

In order to communicate the reservoir 8 with the annulus 14, the wellbore 6 is perforated thereby creating perforations 16. The production string 4 will have attached thereto a multi-passage sand control screen 18 for preventing sand production into the inner diameter 20 of production string 4.

As mentioned earlier, the multi-passage sand control screen means 18 may be employed in an environment wherein the wellbore is a cased hole. The cased hole may be filled with a gravel pack sand, or alternatively, no gravel pack sand may be placed in the annulus 14.

In a different environment, the wellbore 6 may be an open hole completion. The open hole completion may have placed therein a gravel pack sand. Alternatively, no gravel pack sand may be placed within an open hole annulus. The placement of gravel pack sand is generally dependent on the nature and consolidation of the reservoir 8, as previously described.

It should be noted that the wellbore 6 shown in FIG. 1 is a vertical well. The teachings of the present invention are applicable to both vertical and highly deviated wells, such as horizontal extended reach wells. As will be appreciated by those of ordinary skill in the art, the reservoir fluids and gas flow from the reservoir towards the wellbore and into the annulus 14. The formation face 22 refers to the planar disposition of the reservoir formation 8 that has been penetrated and exposed by the drill bit. Generally, the multi-passage sand control screen 18 is inclined parallel with the formation face 22.

Figure 2:
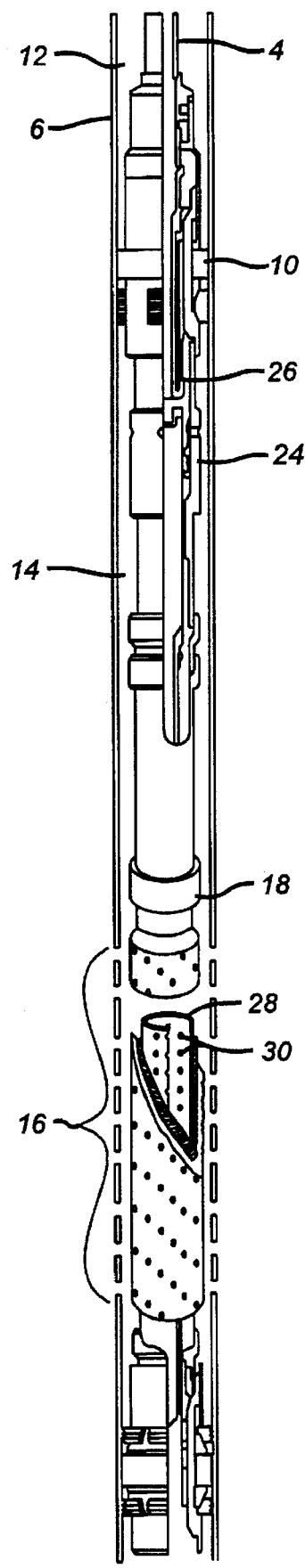
FIG. 2 is a schematic view with cross-section of a multi-passage sand control screen positioned within a wellbore.

Referring now to FIG. 2 wherein a schematic of a multi-passage sand control screen 18 positioned within a wellbore will now be described. Like numerals in the various figures throughout the application denote like components. Therefore, the multi-passage sand control screen 18 is positioned within the wellbore 6, which is a cased hole, with the multi-passage sand control screen 18 being oriented generally parallel to the formation face 22. The production string 4 will have attached thereto the packer means 10 for sealingly engaging with the wellbore 6 thereby creating upper annulus 12 and lower annulus 14. The packer means 10 will have extending therefrom a gravel packing tool 24 with sliding sleeve cross-over device 26 for placing a gravel pack slurry into the annulus 14 and perforation tunnels 16 as is well known in the art. The system depicted in FIG. 2 is applicable to cased hole and open hole gravel packed wells.

Extending from the gravel packing tool means 24 is the multi-passage sand control screen 18 of the present invention. The screen 18 generally comprises a first supporting member 28, which can be a base conduit 28, that contains a series of perforations 30 formed therein.

Figure 3:
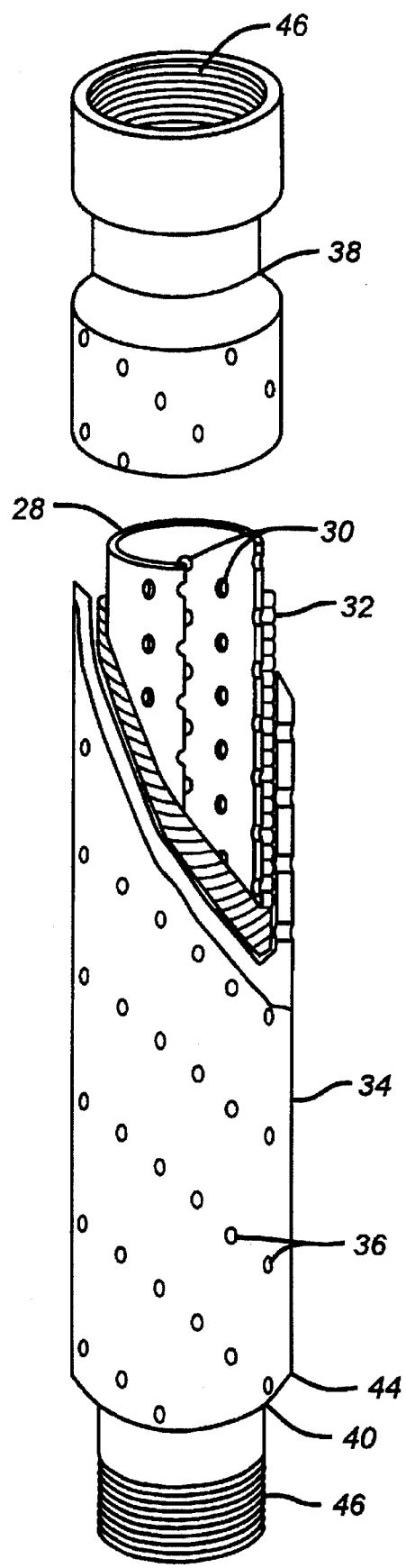
FIG. 3 is a schematic view with cross-section of the preferred embodiment of the multi-passage sand control screen.

An exploded view of the multi-passage sand control screen 18 utilized in the embodiment of FIG. 2 is shown in FIG. 3. Therefore, with reference to FIG. 3, a jacket member 32 is disposed about the first supporting member 28. The jacket member 32 will be described in greater detail in FIGS. 4A and 4B. A perforated conduit 34 for protecting the jacket member 32 in severe dog leg wells is provided. In the embodiment of FIG. 3, the perforated conduit 34 is a conduit 34 with a series of perforations 36 formed thereon for the passage of fluids and gas.

The jacket member 32 will be attached to the supporting member 28 at 38 and 40 so that the jacket member is prevented from linear movement about the supporting member 28. The outer perforated conduit 34 will also be attached to the supporting member 28 at 42, 44 in order to prevent linear movement of the outer perforated conduit 34 about the supporting member 28. The entire multi-passage sand control screen 18 will be attached to the sump packer 15. It should be noted that several joints of the multi-passage sand control screen 18 could be attached in tandem so that longer screen sections are created. As shown in FIG. 3, the screen means 18 will have thread means 46 for threadedly engaging with either another multi-passage sand control screen 18 section or some other downhole component such as the sump packer 15. Thick reservoirs or wells completed in highly deviated wellbores require long sections of screens.

Figure 4A:
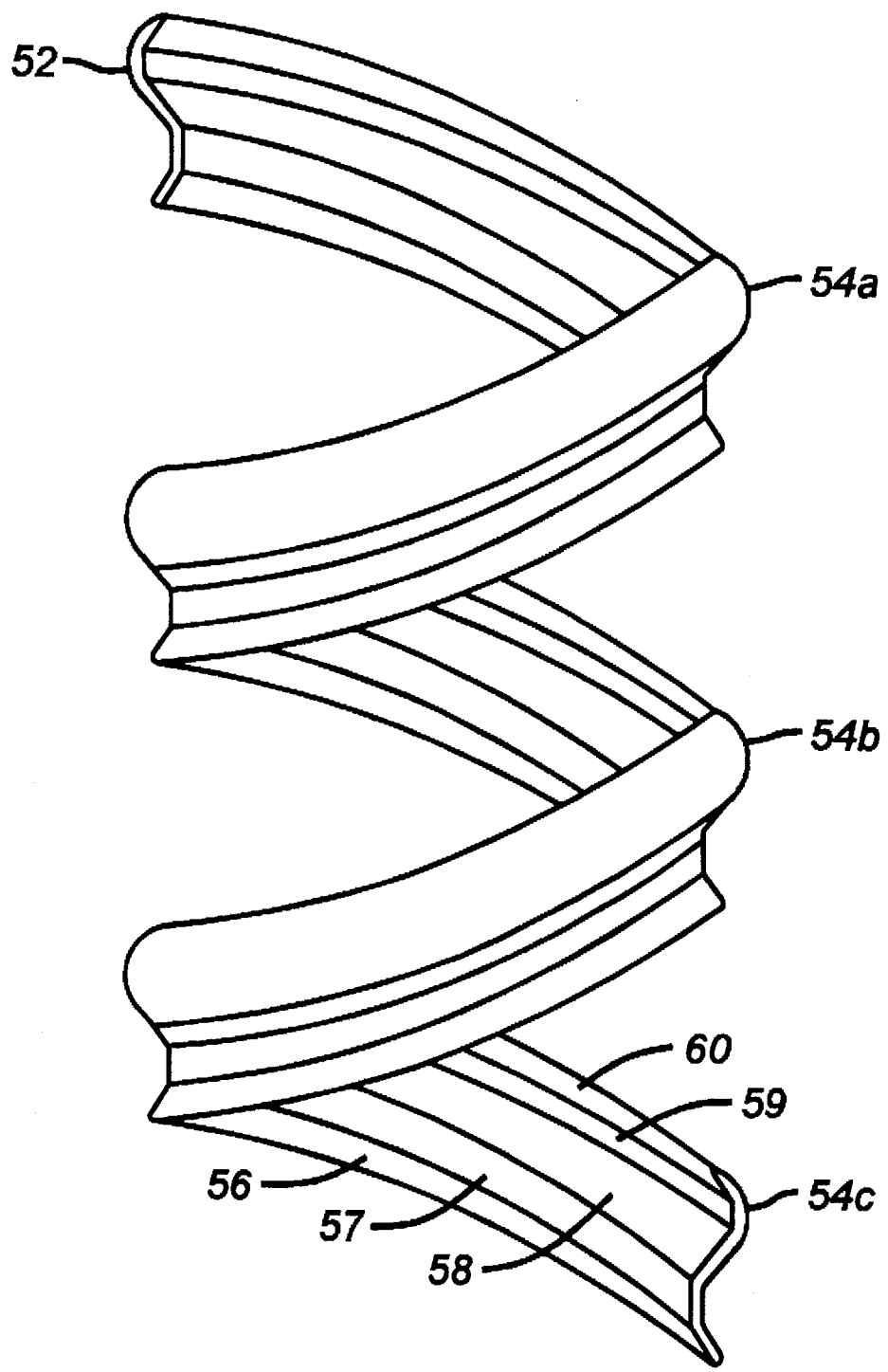
FIG. 4A is an exaggerated view of the jacket member of the present invention placed in tension, with the view depicting the contour of the jacket member and associated passages.

Referring now to FIG. 4A, which is an exaggerated view of the jacket member 32 in tension, the jacket member 32 contains a continuously wound helical member 52 with overlapping loops 54a, 54b, 54c. The helical member 52 will be contoured such that a angled first surface 56 extends to a level second surface 57 which in turn leads to angled third surface 58, with the surface 56, 57 and 58 forming a concave profile. The angled third surface 58 will in turn lead to level fourth surface 59, with the profile of helical member 52 being terminated at angled fifth surface 60. The surface 58, 59, 60 form a convex surface. Jackets of this nature are often used as electrical conduit, and are commercially available from Greenfield Corporation.

Figure 4B:
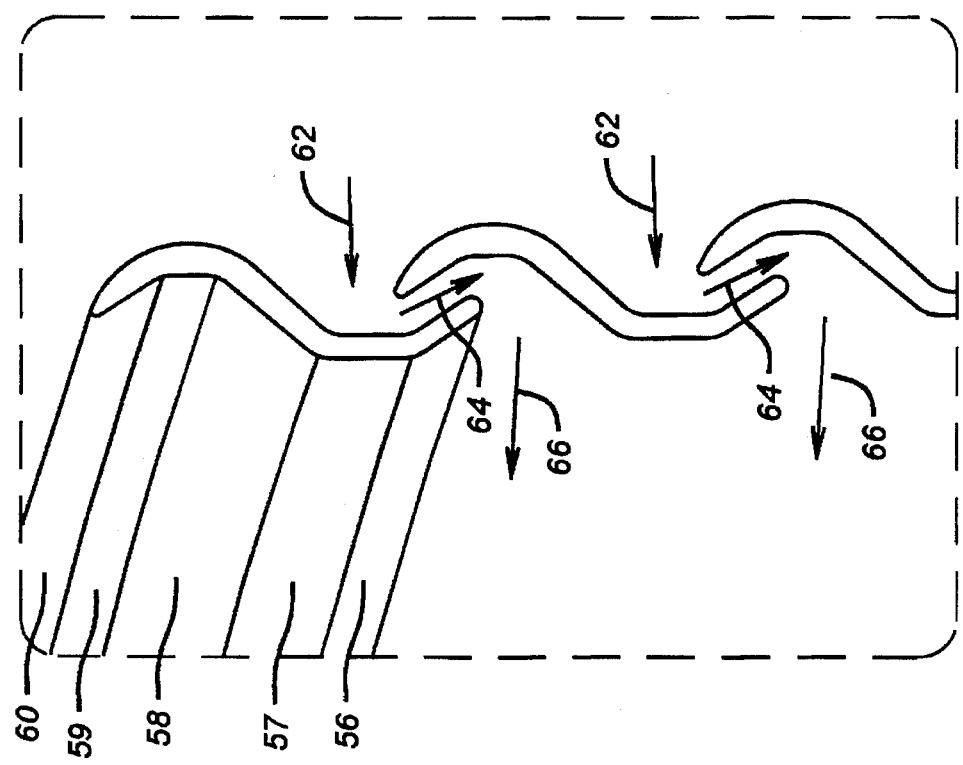
FIG. 4B is an illustrative view of the jacket member of FIG. 4A with a cross-section showing the overlapping loops.

With reference to FIG. 4B, due to the contoured surfaces 56, 57, 58, 59, and 60, the overlapping loops 54b and 54c form a continuous flow passage containing a first passage 62, second passage 64, and a third passage 66, as seen in the enlarged portion of FIG. 4B, with the passages being represented by the enumerated arrows. It should be noted that the helical member 52 could be contoured such that only two passages are formed, or alternatively, that greater than three flow passages are formed thereon.

The nature of the helical member 52, and the interrelationship of the loops 54a, 54b, and 54c, makes it possible for the jacket member 32 to expand and contract the passages 62, 64, and 66 formed thereon. Further, when the jacket member 32 is initially positioned about the supporting member 28, the jacket helical member 52 may be placed either in compression or tension so that the loops can be expanded or contracted during placement of the screen 18 adjacent to the reservoir 8. Thus, in a situation wherein the wellbore is highly deviated, the passages 62, 64, and 66 will allow for the contraction at one axial end 68, and expansion at the opposite axial end 70, and therefore, passage of the screen about the deviated portion is permitted.

Referring again to FIG. 4B, the enlarged portion, the passageway 62 is substantially perpendicular to the wellbore face 22, and thus, flow from the reservoir will occur as depicted by flow line 62. Flow in the passageway 64 is substantially parallel with the wellbore face 22 and is represented by flow line 64. Flow in the passageway 66 is substantially perpendicular with the wellbore face 22 and is represented by flow line 66. The helical wire member is arranged so that the flow of the subterranean fluids and gas travel in an axial downward direction through the jacket member 32. Thus, by having this multi-passage sand control screen presenting a circuitous flow path to the sand, the bridging of sand about the multi-passage sand control screen 18 is significantly enhanced.

Figure 5:
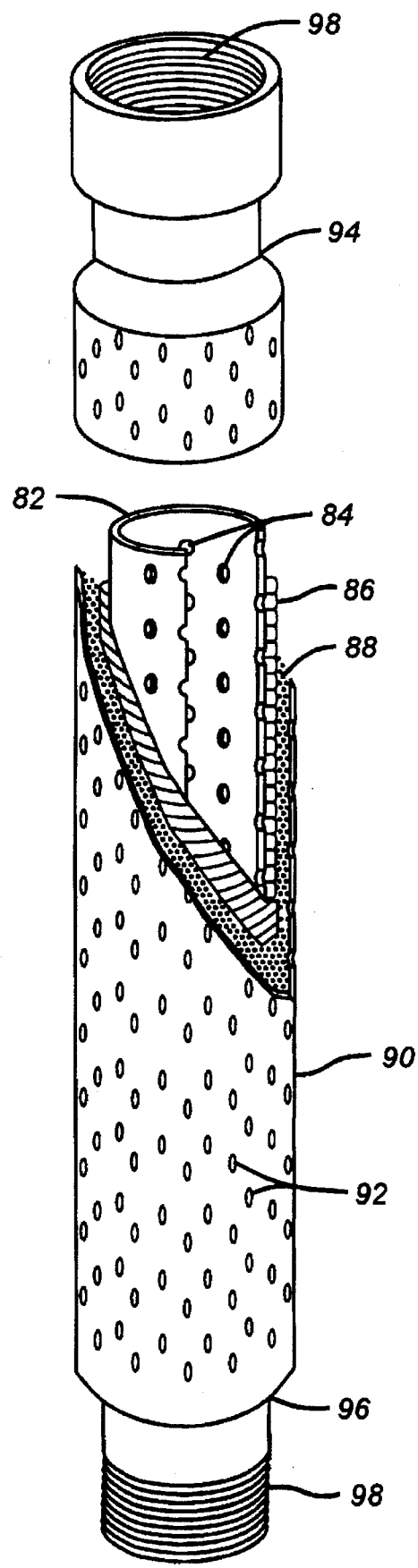
FIG. 5 is a schematic view with cross-section of another embodiment of the multi-passage sand control screen.

Referring now to FIG. 5, an exploded cut-away view of another embodiment of a multi-passage sand control screen 18 is depicted. The embodiment of FIG. 5 depicts a first supporting member 82 that will have a series of perforations 84 for the passage of fluids and gas. The jacket member 86, which is similar to the previously described jacket member 32, is disposed about the supporting member 82. Arranged about the jacket member 86 will be a resin-coated gravel pack sand 88 which is commercially available from Baker Hughes Incorporated and sold under the name "Baker Bond". The consolidated sand allows passage of the reservoir fluids and gas due to its high permeability, but will also act as a sand barrier, which has the effect of adding another level of protection against the production of sand within the inner diameter 20 of the production string 4.

The resin-coated gravel pack sand 88 will have arranged about it an outer perforated jacket conduit 90, which is a conduit with perforations 92 formed therein which has the effect of adding another level of protection against the production of sand within the inner diameter 20 of the production string 4. Both the outer perforated conduit 90 and the jacket member 86 will be attached to the supporting member at 94, 96. Also included will be the thread means 98 for threadedly engaging to other segments of screens or other devices.

Figure 6:
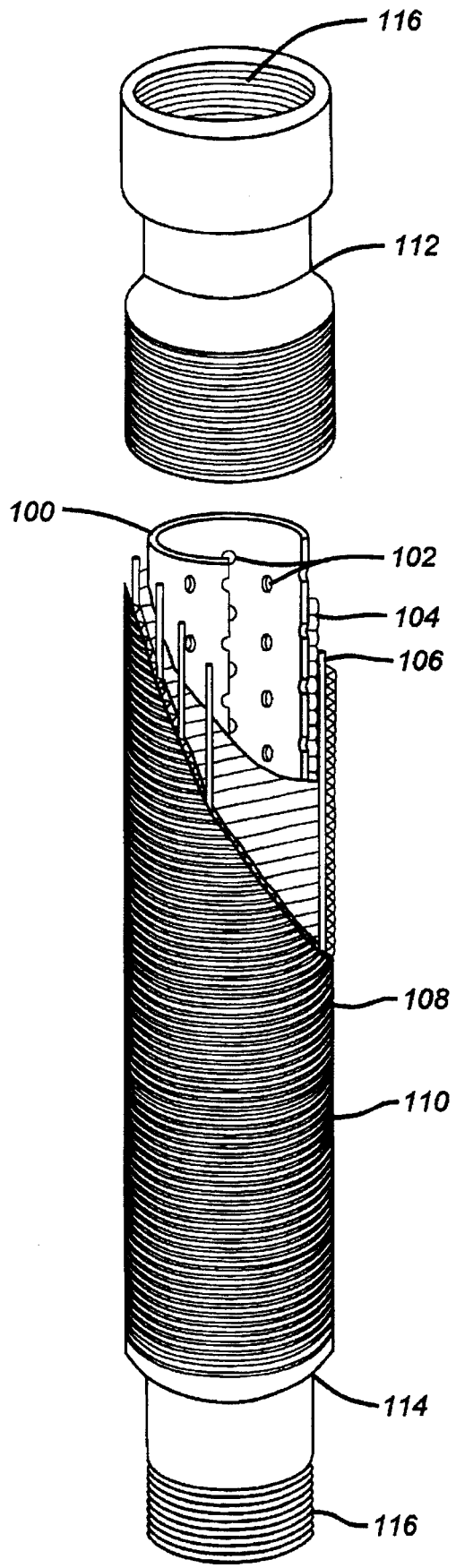
FIG. 6 is a schematic view with cross-section of another embodiment of the multi-passage sand control screen.

Referring now to FIG. 6, an exploded cut-away view of another embodiment of a multi-passage sand control screen 18 is depicted. The embodiment of FIG. 6 depicts a first supporting member 100 that will have a series of perforations 102 for the passage of fluids and gas. The jacket member 104, which is similar to the previously described jacket member 32, is disposed about the supporting member 100. Arranged about the jacket member 104 will be a longitudinal rib wire 106 that runs down the length of the jacket member 104. Also included will be the outer screen means, which in this case is a wire-wrapped screen 108, with the individual loops of the wire forming a passage 110 for the passage of fluids and gas. The wire-wrapped screen 108 is commercially available from Baker Hughes Incorporated and sold under the product name "Bakerweld Jacket". The passage 110 is sized so that the gravel pack sand will bridge at passage 110. The longitudinal rib 106 and the wire-wrapped screen 108 are attached to one another by conventional means such as welding.

The jacket member 104 as well as the wire-wrapped screen 108 will be attached to the supporting member 100 at 112 and 114. The screen 18 will contain thread means 116 for threadedly attaching to other screens 18 or other downhole components. This embodiment may also contain other screens 18 connected in tandem relationship.

Figure 7:
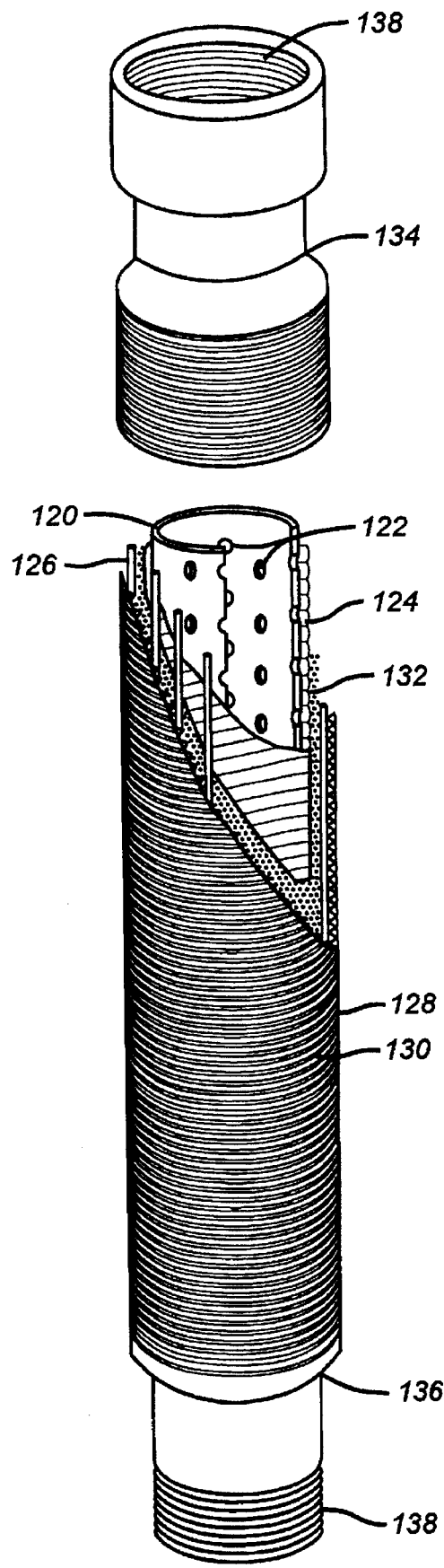
FIG. 7 is a schematic view with cross-section of another embodiment of the multi-passage sand control screen.

Referring now to FIG. 7, an exploded cut-away view of yet another embodiment of a multi-passage sand control screen means 18 is depicted. The embodiment of FIG. 7 depicts a first supporting member 120 that will have a series of perforations 122 for the passage of fluids and gas. The jacket member 124, which is similar to the previously described jacket member 32, is disposed about the supporting member 120. Arranged about the jacket member 124 will be a longitudinal rib wire 126 that runs down the length of the jacket member 124. Also included will be the outer screen means, which in this case is a wire-wrapped screen 128, with the individual loops of the wire forming a passage 130 for the passage of fluids and gas. The passage is sized so that the formation sand and/or gravel pack sand will bridge at passage 130. The longitudinal rib 126 and the wire-wrapped screen 128 are attached to one another by conventional means such as welding. This embodiment will further contain a resin-coated gravel pack sand 132 formed between the jacket member 124 and the wire-wrapped screen 128, which provides yet another screen for the bridging of formation and gravel pack sand into the inner diameter 20 of the production string 4.

The jacket member 124 as well as the wire-wrapped screen 128 will be attached to the supporting member 120 at 134 and 136. The screen 18 will contain thread means 138 for threadedly attaching to other downhole components. This embodiment may also contain other screens 18 connected in tandem relationship.

Figure 8:
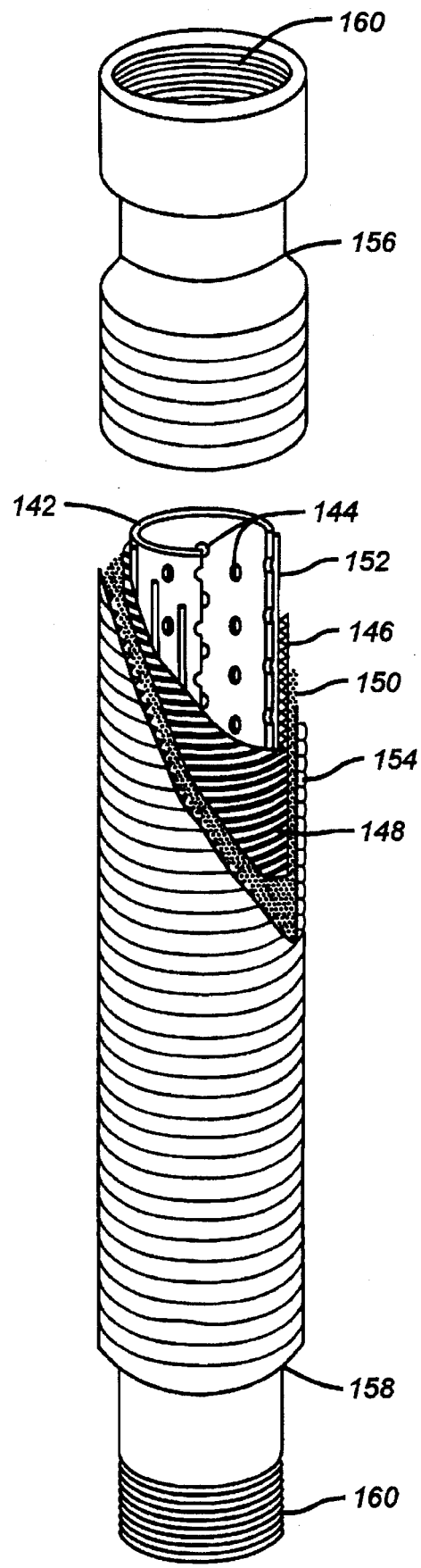
FIG. 8 is a schematic view with cross-section of another embodiment of the multi-passage sand control screen.

Referring now to FIG. 8, an exploded cut-away view of yet another embodiment of a multi-passage sand control screen means 18 is depicted. The embodiment of FIG. 8 depicts a first supporting member 142 that will have a series of perforations 144 for the passage of fluids and gas. Also included will be the screen means, which in this case is a wire-wrapped screen 146, with the individual loops of the wire forming a passage 148 for the passage of fluids and gas. The passage is sized so that the gravel pack sand will bridge at passage 148 if the gravel pack sand has been allowed to permeate to the screen 146. This embodiment will further contain a resin-coated gravel pack sand 150 formed between the jacket member 154 and the wire-wrapped screen 146, which provides the first screen, or layer of defense, for the bridging of formation and gravel pack sand into the inner diameter 20 of the production string 4. The jacket member 154 is disposed about the resin coated sand 150. A longitudinal rib 152 is disposed about the supporting member 142, with the longitudinal rib 152 extending the length of the screen 146 as well as the supporting member 142, which is similar to the previously described embodiment of FIG. 7. The screen 146 and ribs 152 are attached by conventional means such as welding.

The jacket member 154 as well as the wire-wrapped screen 146 will be attached to the supporting member 142 at 156 and 158. The screen 18 will contain thread means 160 for threadedly attaching to other downhole components. This embodiment may also contain other screens 18 connected in tandem relationship.

Changes and modifications in the specifically described embodiments can be carried out without departing from the scope of the invention which is intended to be limited only by the scope of the appended claims.

I claim:

1. An apparatus for controlling sand production within a wellbore completed to a subterranean reservoir comprising:

a first supporting member formed with a series of perforations thereon, said supporting member having a first end and a second end;

a screen mounted over said first supporting member;

a jacket member mounted over said screen presenting exterior and interior surfaces and defining at least one opening extending from the exterior to the Interior surface through the jacket member for presenting first, second and third passageway portions, with the first passageway portion extending generally radially outwardly from the exterior surface, with second passageway portion extending generally along the direction of the interior surface and generally perpendicular to the first passageway portion, and with the third passageway portion extending generally radially Inwardly from the interior surface and generally perpendicular to the second passageway, with the first passageway portion being spaced from the third;

wherein production fluid from the reservoir approaches said jacket member and is directed into the first passageway generally radially, then changes direction and flows in the direction of the Interior surface of said jacket member, and then changes direction again and flows away from the Interior surface radially and directly toward said screen.

2. The apparatus of claim 1 further comprising:

screen means, disposed about said jacket member, for preventing the flow of sand from the subterranean formation into the inner diameter of said first supporting member.

3. The apparatus of claim 2 wherein said screen means comprises:

a wire helically wrapped about a longitudinal rib wire, with said longitudinal rib wire and said wire being attached together, and wherein each wrap of said wire about said longitudinal rib wire forms a third passage for the subterranean gas and fluids.

4. The apparatus of claim 2 wherein said screen means comprises:

a resin-coated gravel pack sand formed about said jacket member, with said resin-coated gravel pack sand being bonded to said jacket member; and a second supporting member disposed about said resin-coated gravel pack sand, with said second supporting member having disposed thereon a plurality of ports so that a third passage is created for the flow of subterranean gas and fluids.

5. The apparatus of claim 2 wherein said screen means comprises:

a resin-coated gravel pack sand formed about said jacket member, with said resin-coated gravel pack sand being bonded to said jacket member;

a longitudinal rib wire attached to said first supporting member; and a wire helically wrapped about a longitudinal rib wire attached to said wire, with said wire being bonded to said resin-coated gravel pack sand, and attached to said rib, and wherein each wrap of said wire about said resin-coated gravel pack sand forming a third passage for the subterranean gas and fluids.

6. The apparatus of claim 2 wherein said screen means comprises:

a second supporting member disposed about said jacket member, with said second supporting member having a series of perforations thereon so that a third passage is formed, said second supporting member being attached to said first supporting member at the first and second end of said first supporting member.

7. The apparatus of claim i wherein said first end and second end of said first supporting member have contained thereon thread means for threadedly attaching a mating thread to said first supporting means, and wherein said jacket member is attached at the first end and the second end of said first supporting member, the apparatus further comprising:

a second supporting member, with said second supporting member having a first end and a second end, with said first and second end containing thread means for threadedly attaching to said first supporting member so that said first supporting member and said second member are interconnected in tandem relationship; and, a second jacket member disposed about said second supporting member, and wherein said second jacket member is attached to said second supporting member at the first end and second end, respectively, of said second supporting member.

8. The apparatus of claim 7 wherein the apparatus further comprises:

conduit means connected to said first supporting member for conveying the subterranean gas and fluid;

packer means, operatively connected to said conduit means above said first supporting member, for sealingly engaging the wellbore;

a gravel packing cross-over tool means supported by said conduit means for gravel packing said wellbore;

sump packer means, operatively connected to said second end of said first supporting member for sealingly engaging the wellbore.

9. An apparatus positioned within a wellbore for controlling said production comprising:

a supporting member with an inner and outer portion, said supporting member having a series of apertures formed thereon;

a first member helically wrapped about said supporting member;

and wherein said helical wrapped member about said supporting member forms a continuous flow passage into the inner portion of said supporting member, with the continuous flow passage comprising a first, second and third segment between wraps of the wrapped member with the passage being offset from one passage to the next for the flow of a subterranean fluid and gas into said inner portion of said supporting member;

said second segment of said passage being at an angle to said first segment to present a circuitous passage that changes the direction of flow at least once.

10. The apparatus of claim 9 wherein said first wire member comprises:

an outer surface having a first convex surface, with said first convex surface leading to a concave surface.

11. The apparatus of claim 10 wherein said first passage for the flow of the subterranean fluids and gas into said inner portion of said supporting member is substantially perpendicular to said wellbore, said second passage is substantially parallel with said wellbore, and said third passage is substantially perpendicular with said wellbore.

12. The apparatus of claim 11 wherein said supporting member has a first end and a second end, and wherein said first member is attached at the first end and second end of said supporting members.

13. The apparatus of claim 12 wherein said first member is arranged so that the flow of the subterranean fluids and gas travel in a downward axial direction.

14. The apparatus of claim 13, further comprising:

a second member helically disposed about said first member, with said second member having a longitudinal rib disposed between said first member and said second member, with said second member being attached to said longitudinal rib and wherein said second member forms a fourth passage.

15. The apparatus of claim 13 further comprising:

an outer supporting member disposed about said first member, with said outer supporting member having a series of apertures thereon so that a fourth passage for the flow of subterranean fluids and gas is formed.

16. The apparatus of claim 13 further comprising:

a resin-coated gravel pack sand formed about said first member, with said resin-coated gravel pack sand being bonded to said first wire member;

an outer supporting member disposed about said resin-coated gravel pack sand, with said outer supporting member having a series of apertures so that a fourth passage for the flow of subterranean fluids and gas is formed.

17. The apparatus of claim 13, further comprising:

a resin-coated gravel pack sand formed about said first member, with said resin-coated gravel pack sand being bonded to said first member;

a second member helically disposed about said resin-coated gravel pack sand, with said second member having a longitudinal rib disposed between said first member and said second member, with said second member being attached to said longitudinal rib and wherein said second helically disposed member forms a fourth passage.

18. An apparatus for controlling the sand production from a subterranean wellbore, the wellbore intersecting a subterranean reservoir containing hydrocarbons, said apparatus comprising:

a base conduit having a series of ports to allow the flow of subterranean gas and fluids;

a jacket member disposed about said base conduit, said jacket member having a wound helical member with overlapping loops, and with said helical member being contoured such that the overlapping loops form a first, second and third passage for the flow of subterranean gas and fluids, said first passage allows flow to radially approach said jacket member, said second passage constitutes a continuation of said first passage, and is generally axially oriented through said jacket member, said third passage allows flow to directly approach said base conduit;

screen means, arranged about said jacket member, for preventing the flow of sand from the subterranean formation into the inner diameter of said base pipe.

19. The apparatus of claim 18 wherein said screen means includes:

a second wire helically wrapped about said jacket member, with said second wire being attached to said base conduit, and wherein each wrap of said second wire about said jacket member forming a fourth passage for the subterranean fluids and gas.

20. The apparatus of claim 19 wherein said screen means further comprises:

a resin-coated gravel pack sand formed between said second wire and said jacket member, with said resin-coated gravel pack sand being bonded to said jacket member.

21. The apparatus of claim 18 wherein said screen means comprises:

a supporting conduit arranged about said jacket member, said supporting conduit containing a plurality of apertures forming a fourth passage for the flow of the subterranean fluids and gas.

22. An apparatus for completing a wellbore comprising:

a cylindrical member extending into the wellbore, said cylindrical member having an inner and outer diameter;

packer means, operatively associated with said cylindrical member, for sealingly engaging the wellbore;

a cross-over tool means, connected to said packer means, for placing a gravel slurry in the annulus of the wellbore;

screen means, connected to said tubing string, for preventing the flow of sand into the inner diameter of said cylindrical member and allowing passage of a subterranean fluid and gas, with said screen means comprising:

a base conduit formed with a series of perforations thereon, said base conduit having a first end and a second end;

a contractible jacket member disposed about said base conduit, said contractible jacket member having a continuously wound helical member with overlapping loops, and with said helical member being contoured such that the overlapping loops form a first, second and third passage between wraps of the wrapped wire member with the passage being offset from one passage to the next for the flow of the subterranean fluids and gas, said first passage allows flow to radially approach said jacket member, said second passage constitutes a continuation of said first passage and is generally axially oriented through said jacket member, said third passage allows flow to directly approach said base conduit;

and wherein said contractible jacket member is attached to said base conduit at the first end and the second end.

23. The apparatus of claim 22 further comprising:

a flow conduit member being disposed about said contractible jacket member, said flow conduit having a plurality of apertures formed thereon for the passage of the subterranean fluids and gas.

24. The apparatus of claim 22 further comprising:

a longitudinal rib wire arranged along said contractible jacket member;

a wire helically wrapped about said longitudinal rib wire, with said longitudinal rib wire and said wire being attached together, and wherein each wrap about said contractible jacket member forms a passageway for the subterranean fluids and gas.

25. The apparatus of claim 22 further comprising:

a resin-coated gravel pack sand formed about said contractible jacket member, with said resin-coated gravel pack sand being bonded to said contractible jacket member; and a flow conduit disposed about said resin-coated gravel pack sand, with said flow conduit having disposed thereon a plurality of ports for allowing the passage of the subterranean fluids and gas.

26. The apparatus of claim 22 further comprising:

a resin-coated gravel pack sand formed about said contractible jacket member, with said resin-coated gravel pack sand being bonded to said contractible jacket member;

a longitudinal rib wire arranged about said contractible jacket member; and a wire helically wrapped about the longitudinal rib with the wire being attached to said rib, with said wire being bonded to said resin-coated gravel pack sand, and wherein each wrap of said wire forming a passageway for the subterranean fluids and gas.

27. An apparatus for controlling sand production within a wellbore completed to a subterranean reservoir comprising:

a supporting member formed with a series of perforations thereon, said supporting member having a first end and a second end;

screen means, disposed about said supporting member, for preventing the flow of sand from the subterranean formation into the inner diameter of said supporting member; and, a jacket member disposed about said screen means, said jacket member comprising a wound member with overlapping loops, and with said wound member being contoured such that said overlapping loops form no more than a first and second passage for the flow of a subterranean gas and fluid;

wherein production from the reservoir approaches said jacket and is directed into said first passage which is generally axially aligned with said jacket member and flow continues toward said supporting member as said second passage forms an offset which directs flow directly at said supporting member.

28. The apparatus of claim 27 further comprising:

a resin-coated gravel pack sand formed between said screen means and said jacket member, with said resin-coated gravel pack sand being bonded to said screen means.

29. The apparatus of claim 28 wherein said screen means comprises:

a wire helically wrapped about a longitudinal rib wire, with said longitudinal rib wire and said wire being attached together, and wherein each wrap of said wire about said longitudinal rib wire forms a third passage for the subterranean gas and fluids.

* * * * *